US008920094B2

United States Patent
Ali et al.

(10) Patent No.: US 8,920,094 B2
(45) Date of Patent: *Dec. 30, 2014

(54) APPARATUS AND METHOD OF MAKING AN OFFSET NAIL

(75) Inventors: Zafar I. Ali, Tinley Park, IL (US); Donald E. Bergstrom, Lindenhurst, IL (US); William L. Gabriel, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 667 days.

This patent is subject to a terminal disclaimer.

(21) Appl. No.: 12/644,890

(22) Filed: Dec. 22, 2009

(65) Prior Publication Data
US 2010/0183403 A1 Jul. 22, 2010

Related U.S. Application Data

(63) Continuation-in-part of application No. 12/175,704, filed on Jul. 18, 2008, now Pat. No. 8,100,618.

(51) Int. Cl.
*F16B 15/02* (2006.01)
*B21G 3/12* (2006.01)

(52) U.S. Cl.
CPC . *B21G 3/12* (2013.01); *F16B 15/02* (2013.01); *Y10S 411/923* (2013.01)
USPC .......................................... 411/439; 411/923

(58) Field of Classification Search
CPC .................................................. F16B 150/02
USPC .................. 411/439, 442, 473, 486, 923, 398

See application file for complete search history.

(56) References Cited

U.S. PATENT DOCUMENTS

| 387,066 | A | * | 7/1888 | Greer | 411/489 |
| 387,068 | A | * | 7/1888 | Greer | 411/446 |
| 451,859 | A | * | 5/1891 | Hammond | 411/486 |

(Continued)

FOREIGN PATENT DOCUMENTS

| CH | 678971 A5 * 11/1991 |
| CN | 1188390 A 7/1998 |

(Continued)

OTHER PUBLICATIONS

International Search Report and Written Opinion of the International Searching Authority issued in connection with PCT/US2009/0045121 on Jun. 25, 2009.

*Primary Examiner* — Flemming Saether
(74) *Attorney, Agent, or Firm* — Levenfeld Pearlstein, LLC

(57) ABSTRACT

A nail having an offset head is configured with a multi-step support gusset formed integrally between an undersurface of the offset head and a superior portion of a shank. The head of the nail is relatively thin, and the shank is positioned radially off center of the head. A first portion of the gusset defines an angle relative to the shank axis and the second portion of the gusset defines an angle relative to the shank axis different from that of the first portion. The support gusset reinforces the junction of the shank with the head, supports the toe of the head, and distributes the force of a load on the head through a longitudinal axis of the shank, preventing the toe from bending or yielding and prevents the shank from yielding to the stresses of the load applied.

11 Claims, 14 Drawing Sheets

(56) References Cited

U.S. PATENT DOCUMENTS

| | | | |
|---|---|---|---|
| 1,042,955 A * | 10/1912 | Nurnberger | 411/486 |
| 1,333,859 A * | 3/1920 | Lundie | 411/486 |
| 1,456,682 A | 5/1923 | Steffe | |
| 1,899,264 A * | 2/1933 | Faries | 411/488 |
| 2,283,766 A * | 5/1942 | Sbicca | 411/477 |
| 2,513,513 A * | 7/1950 | Omoto | 411/486 |
| 2,533,062 A * | 12/1950 | Spink | 411/470 |
| 3,358,822 A | 12/1967 | O'Connor | |
| 3,359,582 A | 12/1967 | C.W. Powers | |
| 3,861,526 A | 1/1975 | Leistner | |
| 5,056,976 A | 10/1991 | Sygnator et al. | |
| 5,154,670 A | 10/1992 | Sygnator et al. | |
| 5,195,931 A | 3/1993 | Wright et al. | |
| 5,476,351 A | 12/1995 | Binder et al. | |
| 5,482,419 A | 1/1996 | Leistner | |
| 5,533,379 A | 7/1996 | Binder et al. | |
| 5,988,967 A | 11/1999 | Jones | |
| 6,676,349 B1 * | 1/2004 | Mey | 411/80.5 |
| 6,676,528 B1 | 1/2004 | Carlsen | |
| 7,014,407 B2 | 3/2006 | Crompton et al. | |
| 7,374,383 B2 | 5/2008 | Crompton et al. | |
| 2002/0052244 A1 | 5/2002 | Halstead et al. | |

FOREIGN PATENT DOCUMENTS

| | | | |
|---|---|---|---|
| CN | 1703291 A | | 11/2005 |
| CN | 1826474 A | | 8/2006 |
| DE | 142302 A5 | | 6/1980 |
| GB | 193740 | * | 3/1923 |
| WO | 9742421 | | 11/1997 |

* cited by examiner

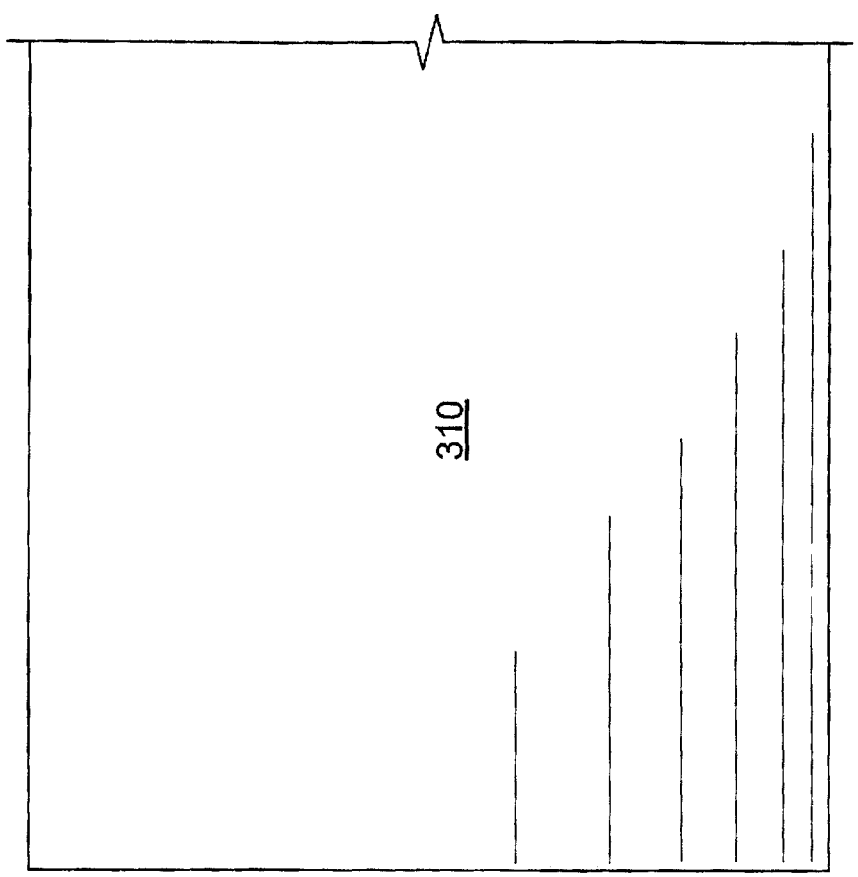
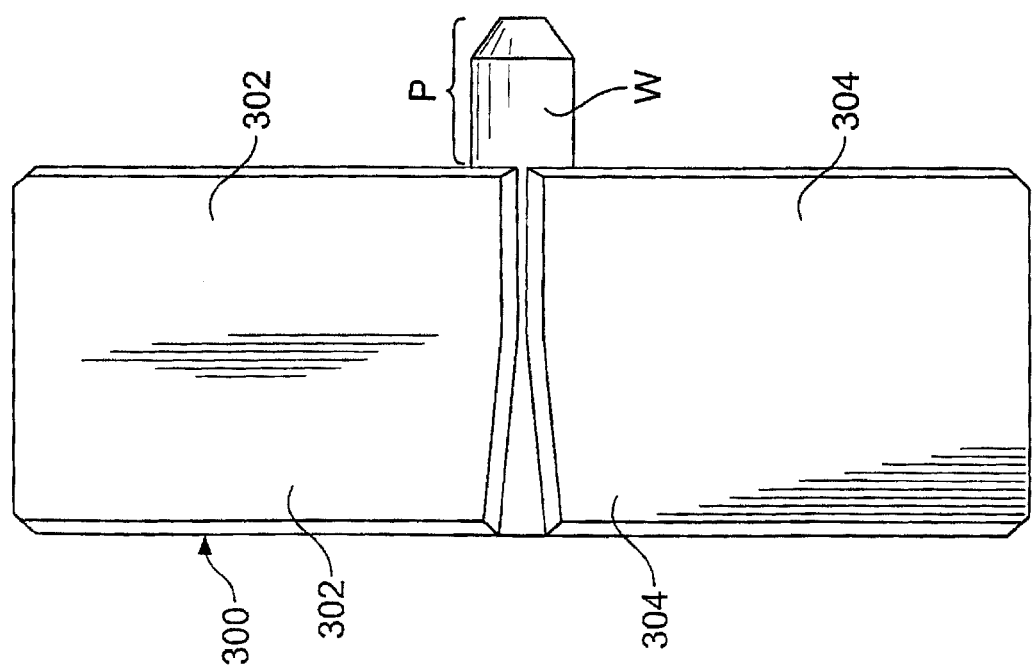
FIG. 11

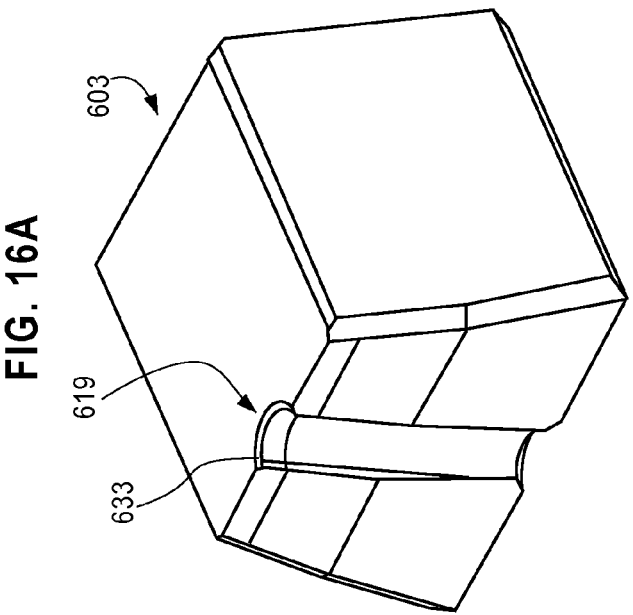
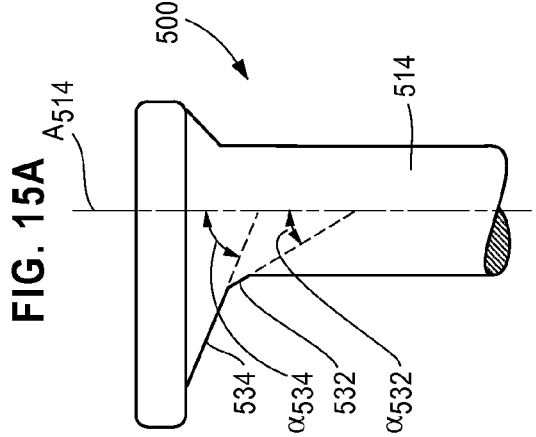
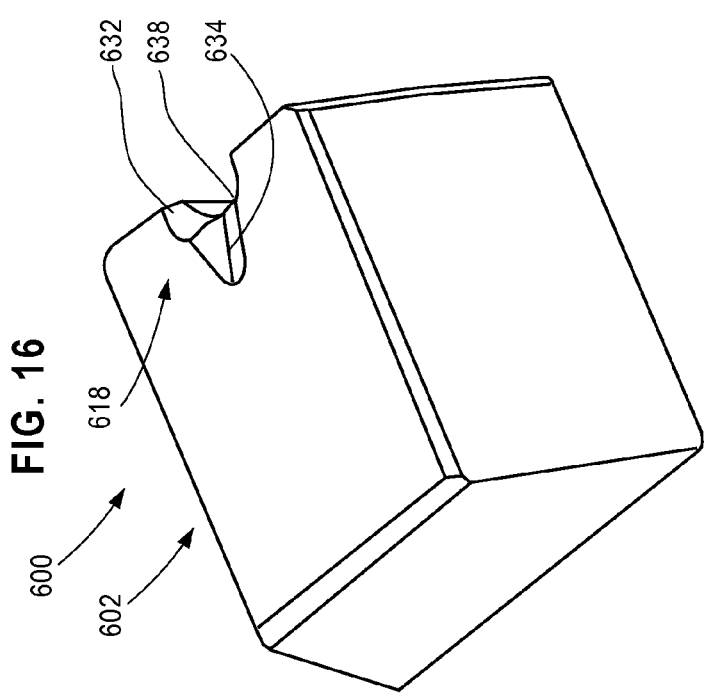

APPARATUS AND METHOD OF MAKING AN OFFSET NAIL

CROSS-REFERENCE TO RELATED APPLICATION

This application is a continuation-in-part of and claims the benefit of priority to U.S. patent application Ser. No. 12/175,704, filed Jul. 18, 2008, entitled "APPARATUS AND METHOD OF MAKING A HEEL-LESS NAIL".

BACKGROUND OF THE INVENTION

The present invention is directed to a nail. More particularly, the present invention pertains to a radially offset, full or partially round headed nail and a method of making same.

Nails are often used in power driving tools to quickly and efficiently secure objects such as wood. Generally, nails have a head and an elongated shank and are linearly collated in an adhesive strip made of plastic or paper tape or the like, with the shanks oriented in a parallel relationship. The nails are ejected sequentially as the driver blade of the power driving tool strikes each of the heads individually. The nails in the strip are, therefore, spaced apart so that the heads do not interfere with each other during discharge. As a result, because of the size and configuration of full-round heads, only a limited number of full-round head nails may be included in a particular strip.

To increase the number of nails per length of strip, manufacturers have developed offset nails in which the longitudinal axis of the shank is positioned radially off-center of the head. An offset head generally has a toe and a heel. The toe refers to the greater portion of the offset head, in the direction opposite to the radial displacement of the shank. The heel refers to the lesser portion of the head, in the direction of radial displacement of the shank from the center of the head. Portions of the heel and toe are unsupported by the shank of the nail.

Offset nails allow the pitch, i.e., the distance between the shanks of nails, to be closer together, allowing additional offset nails to be included per length of strip than traditional nails in a comparable strip. The power driving tool, therefore, needs to be reloaded less often, saving time. Often these offset nails are also redesigned with elongated or partially-rounded heads because partially-round head nails are easier to form than full-round head nails. Offset full-round head nails, however, are readily identified with concentric round head nails where construction codes define requirements for nail heads in specific fastening applications. The round head nails have a full 360 degree rim (as opposed to a 180 degree or other shaped configuration of head) giving extra clamping or, "hold down" so to speak, when the nail is driven into a nailing medium.

Regardless of whether the nail has a full-round head or a partially-round head, however, each is subject to similar deformations when driven. Due to the configuration of the nails in the collated strip, the offset nail can be struck at a position not supported by the shank, for example, at the toe. The force of the driving blade can bend the toe of the head if the head is not supported properly or if the head is too thin. In addition, the shank may also bend if the load from the force of the driving blade strike is not distributed through the axis of the shank properly. Furthermore, the junction between the head and the shank, the chamfer, may not be strongly attached, thus lead to breakage during nailing and causing the power driving tool to jam or fail.

To compensate for these challenges, offset full or partially round head nails have been manufactured with thickened heads. In addition, these nails have been manufactured such that the shank is slightly off-center to take advantage of the ability to combine more nails in a strip, but are not fully off-center of the head, leaving a heel about twenty (20) mils, so that less of a toe is present. However, these solutions require additional material to be used to make the head thicker, and the number of nails per strip is not maximized because of the size of the heel under the head.

Accordingly, there is a need for an offset head with a full or partially-round head that can be collated to maximize the number of nails in a strip. In addition, it would be desirable for such a nail to withstand large forces without bending or yielding without adding material.

BRIEF SUMMARY OF THE INVENTION

A full-round or partially round head nail having an offset head integrally connected to a shank is configured with a support gusset formed integrally between an undersurface of the offset head and a superior portion of the shank. The head of the nail is relatively thin when compared to known off-set full and partially-round-head nails, having a thickness of about 0.025 inches (25 mils) to about 0.045 inches (45 mils) and preferably about 35 mils. The shank is positioned radially off center of the head such that a minimal heel is formed having a length approximately between about 0 and 10 mils, and preferably between about 4 and 5 mils.

In an embodiment, the support gusset is a single, continuous, ovoid, pear-shaped, or tear-shaped gusset having a lofted shape tapering radially from a roundness at the heel to a taper at the toe and flows from, and along an undersurface of the head, tapering down to the superior surface of the shank.

In another embodiment, the support gusset is a multi-step or tiered structure having at least one conical gusset and at least one tear-shaped gusset. The conical gusset encircles the superior surface of the shank concentrically and widens gradually as it reaches an underside of the head. The conical gusset flows from along an undersurface of the head, tapering down to the superior surface of the shank. At least one tear-shaped gusset extends from a toe side of the conical gusset radially toward the toe. The tear-shaped gusset is a lofted surface flowing from the undersurface of the head down, at or adjacent to the circular shaped gusset, and may have a convex or concave shape as it widens and thickens gradually from the toe to the conical gusset. The tear-shaped gusset may cover the entire undersurface of the toe, or may cover a portion of the undersurface of the toe.

The support gusset reinforces the junction of the shank with the head while providing support for the toe of the head, i.e., the portion of the head not supported by the shank. The support gusset also distributes the force of a load on the head to the longitudinal axis of the shank. The distribution of the load prevents the toe from bending or yielding and prevents the shank from yielding due to the stresses of the load applied.

The offset nail is manufactured using either a single blow impact nail heading machine or using a cold rolling-based technology machine. For the latter, a wire is inserted into a die formed complimentary to the shape of the nail. The cold rolling technique uses a first roller to prebend the wire in the die and then a second roller to compress the wire within the die to form the nail head and support gusset beneath it. The ovoid, pear, or tear-drop form geometry of the support gusset, in combination with the amount of material clamped in the prebend position, combine to form a round or partially round head as the material naturally flows under the compressive load from the second head roller.

The die to form the offset head nail is made from two grippers. The grippers have cavities complimentary to the shank and the support gusset of the nail. The complimentary support gusset portion of the gripper (or die) facilitates the flow of the metal wire to produce a nail head.

These and other features and advantages of the present invention will be readily apparent from the following detailed description, in conjunction with the claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIGS. 11-14 illustrate a side view of the die used in a present method for manufacturing the full or partially round head of the offset nail;

FIG. 15A is a schematic, side sectional view of the nail illustrating the relative angles of the multi-step gusset; and FIG. 16 is a perspective view of an embodiment of the die used to produce the offset nail of FIG. 15.

DETAILED DESCRIPTION OF THE INVENTION

Figure 1:
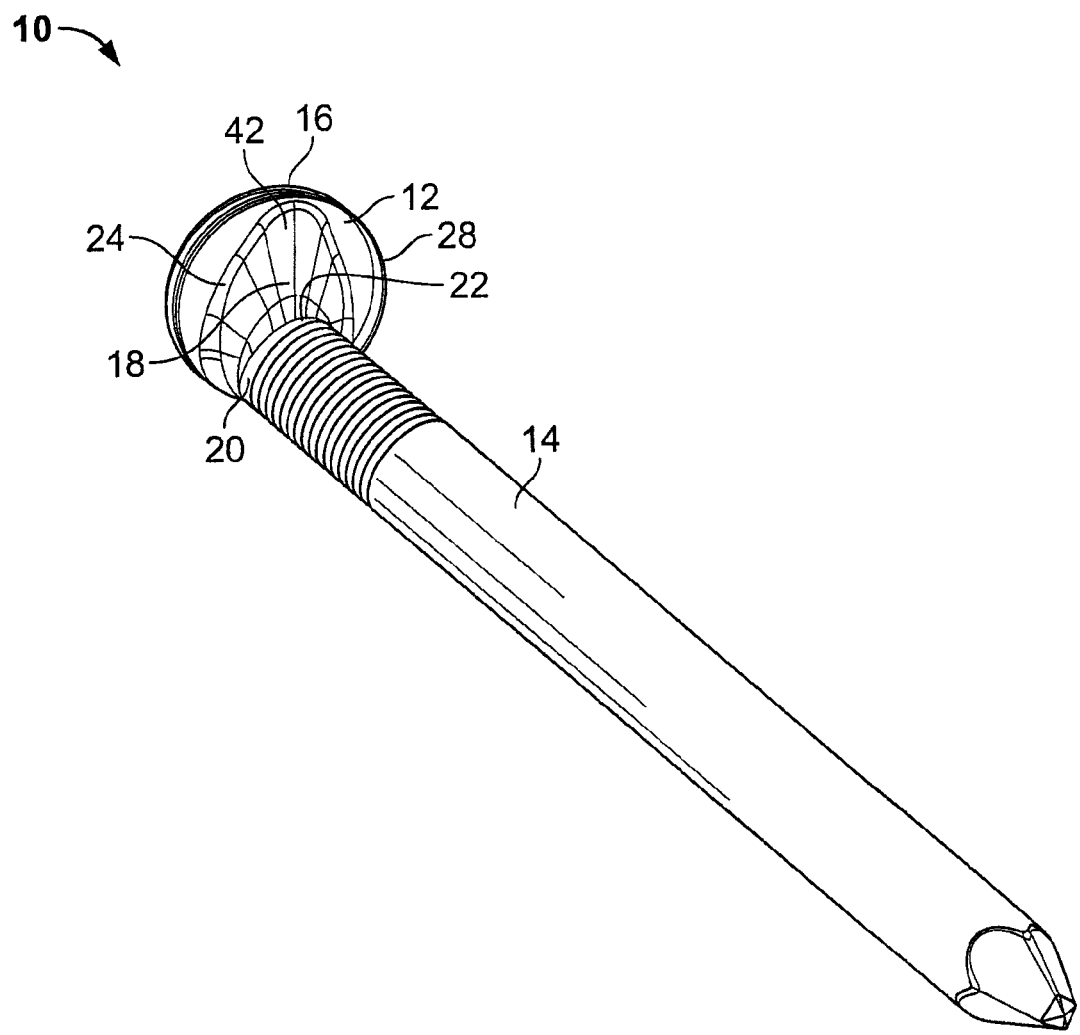
FIG. 1 is a perspective view of an embodiment of an offset nail with supporting gusset in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment(s) illustrated.

It should be further understood that the title of this section of this specification, namely, "Detailed Description of the Invention", relates to a requirement of the United States Patent Office, and does not imply, nor should be inferred to limit the subject matter disclosed herein.

The present invention pertains particularly to an offset, support-gusseted, nail (hereafter "offset nail"), methods of making the offset nail, and the die used to form the offset nail. The offset nail is formed from a wire of plain or galvanized steel, aluminum, copper, stainless steel, or other metallic or non-metallic material. The offset nail may have a smooth, grooved, or deformed (threaded) shank, and several offset nails can be collated into strips for use in a power tool. The offset nail of the present invention has an offset head ("head"), a nail shank ("shank"), and a single or multi-tiered support gusset ("support gusset") integrally connected to both the head and shank. The head can be full round or partially round.

The shank is positioned radially off-center from the head and is inscribed within the circumference of the head.

The support gusset provides added strength to the junction of the head and shank and distributes load from the head through the longitudinal axis of the shank. The support gusset, in an embodiment, is a single, continuous, ovoid, pear, tear or other-shaped tapered buttress providing precise and focused support to the toe of the head and an upper portion of the shank. In another embodiment, the support gusset is a layered, stepped, or multi-tiered structure having at least one conical gusset and tear-shaped gusset.

The offset nail is manufactured by either a single blow nail heading machine or using a cold rolling process machine.

In a cold-rolling process, a nail wire blank is inserted into a die with a portion of the wire exposed. Through precise angled rolling of the first roller over the die, a pre-bent shape is formed. The offset nail is formed with a round head and a gusset using a second compression roller. The clamping die, or "gripper" is tooled with geometry complimentary to the support gusset of the offset full or partially round head nail, but does not have an impression of the circular profile of the round head. Therefore, precise pre-bent shape, in combination with the precise ovoid or tear-shaped gusset form, is necessary to manufacture the circular or partially circular profile of the heads of the offset nail. The portion of the die complimentary to the support gusset facilitates the flow of metal wire to form the head. In other words, the support gusset not only strengthens the integrity of the junction of head and shank and redistributes load applied to the head, the die portion complimentary to the support gusset also facilitates the formation of the desired circular or partially circular profile of the head.

Figure 2:
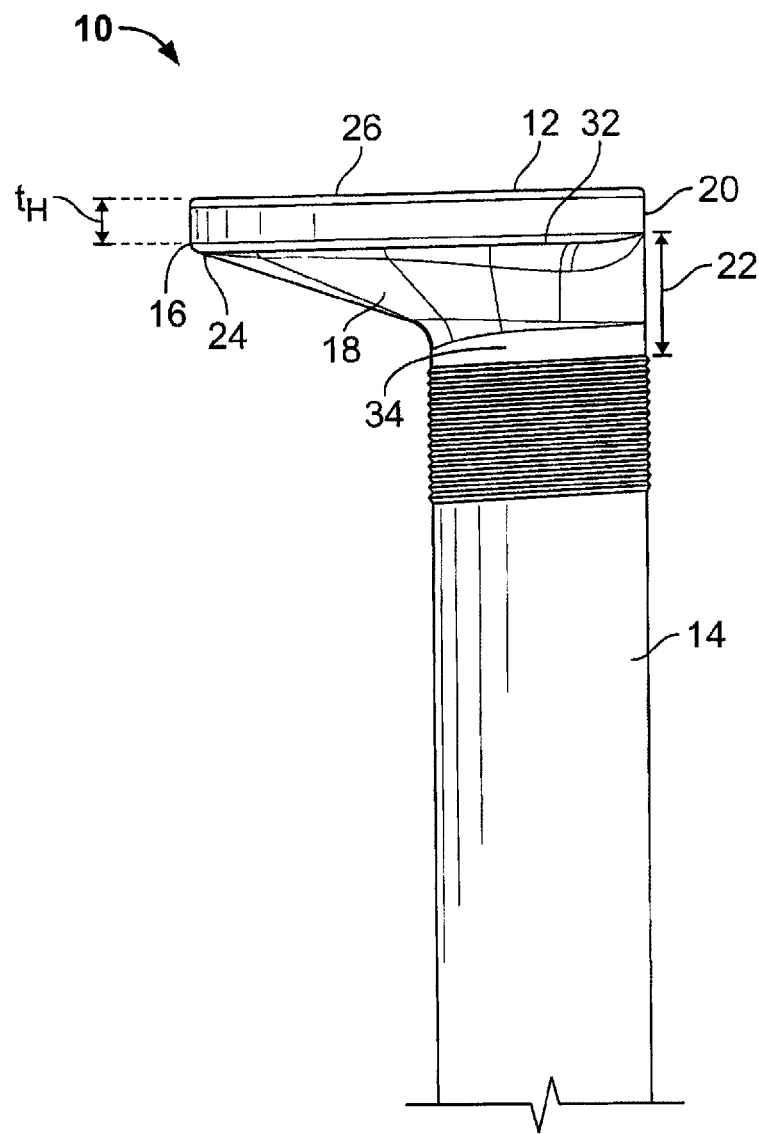
FIG. 2 is a side view of the offset nail.

Referring now to the figures and in particular FIGS. 1 and 2, there is shown an embodiment of the present invention. An offset nail 10 is illustrated having a full or partially round head 12 and a shank 14. The head 12 has a circular profile having a top surface 26 and a bottom surface 24. It will be appreciated that a full-round head is illustrated for example purposes only and that any round or partially round head is in the spirit and scope of the present invention. The shank 14 is positioned within the circumference 28 of the head 12. The portion of the head 12 unsupported by the shank 14 is the toe 16. The head 12 has a thickness $t_H$. The support gusset 18 envelopes the junction 22 between the shank 14 and the head 12.

Figure 3:
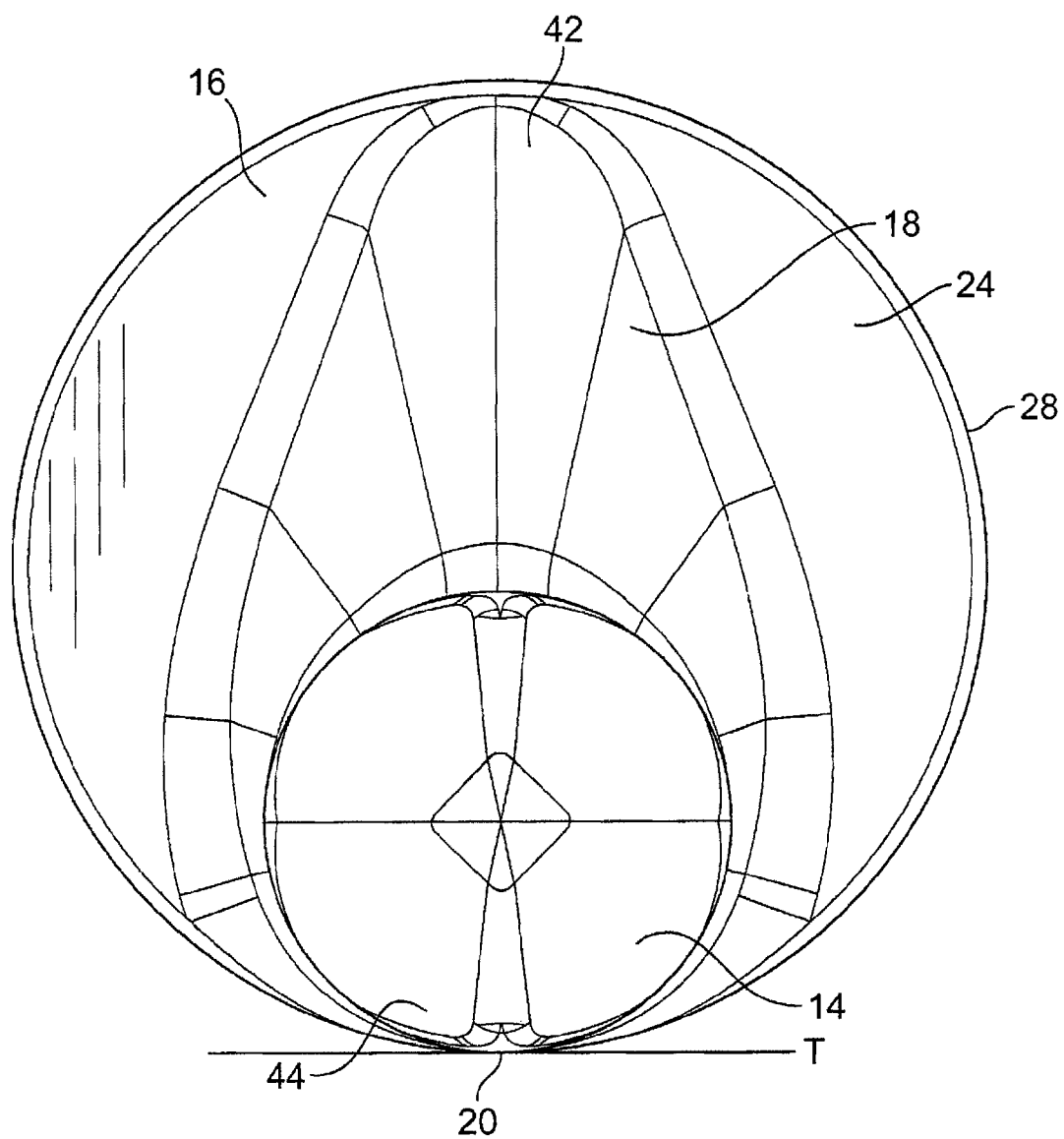
FIG. 3 is a bottom view of the offset nail.
Figure 4:
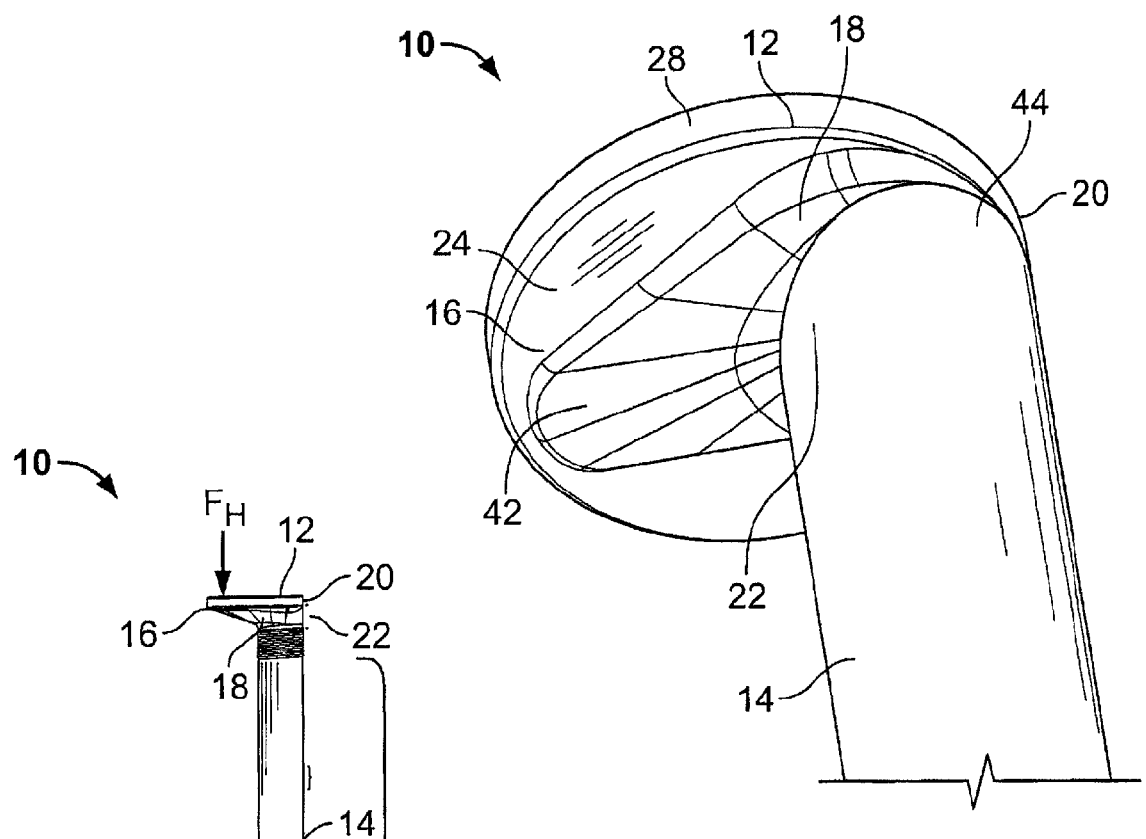
FIG. 4 is a perspective view of the undersurface of the offset nail head.
Figure 5:
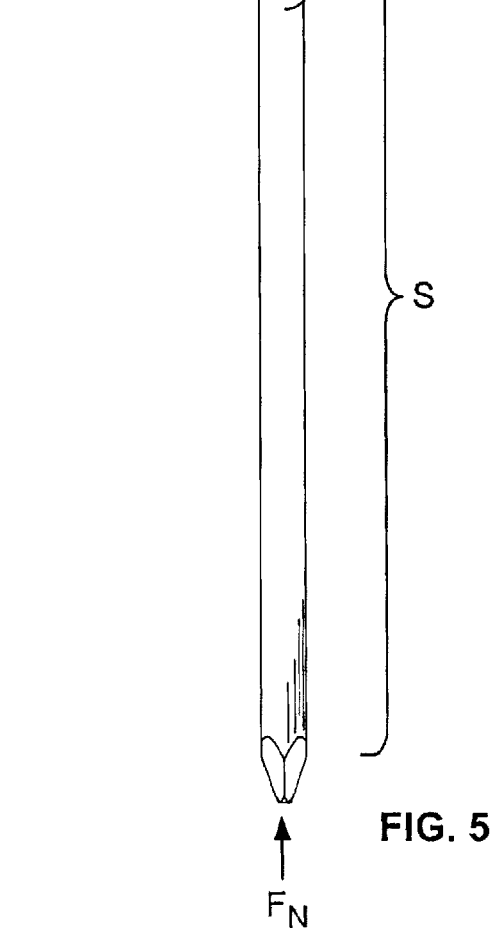
FIG. 5 is a side view of the offset nail.

FIG. 3-5 show views from the bottom and side of the offset nail 10. The undersurface 24 of the head 12 is shown, the head 12 having a circumference 28. The support gusset 18 is a single continuous, ovoid, pear, or tear-shaped lofted formation with a taper 42 in the direction of the toe 16 and has a rounded bottom 44. The support gusset 18, in a present embodiment, is tear-shaped, with a rounded portion 44. The support gusset 18 tapered portion 42 is elongated radially in the direction of the toe 16. The support gusset 18 is lofted from the support gusset edge 32 to the support gusset base 34. The support gusset 18 envelopes and is integrally connected to the junction of the shank 14 and the head 12.

Figure 6:
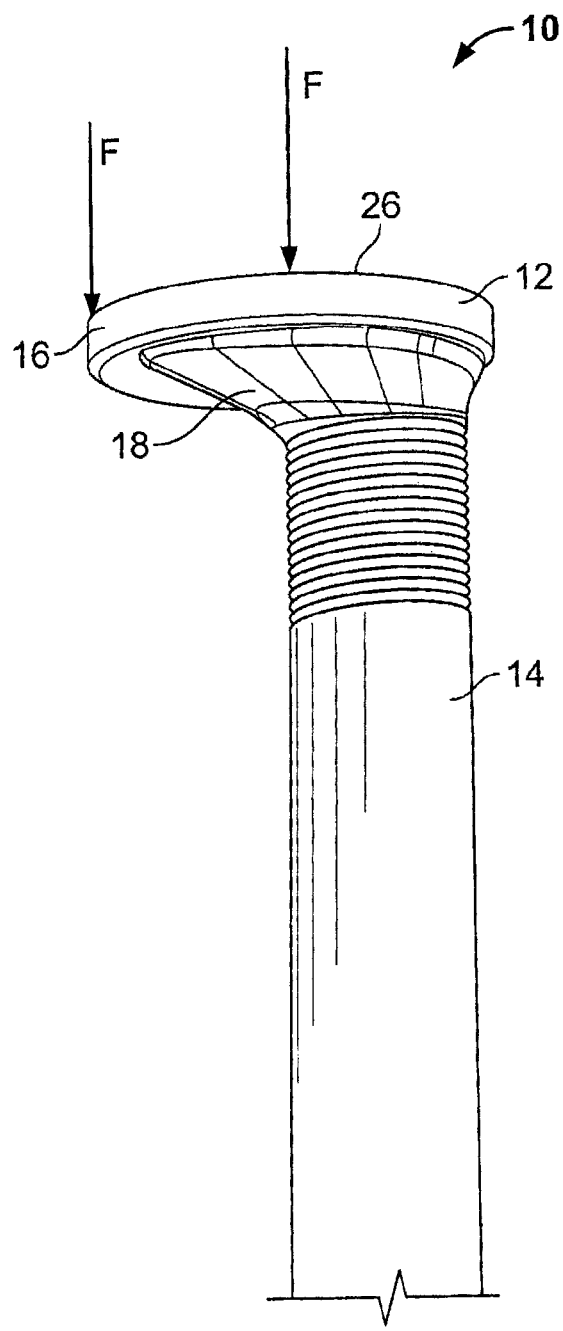
FIG. 6 is a perspective view of the offset nail illustrating the deformation stresses experienced by the offset nail.
Figure 7:
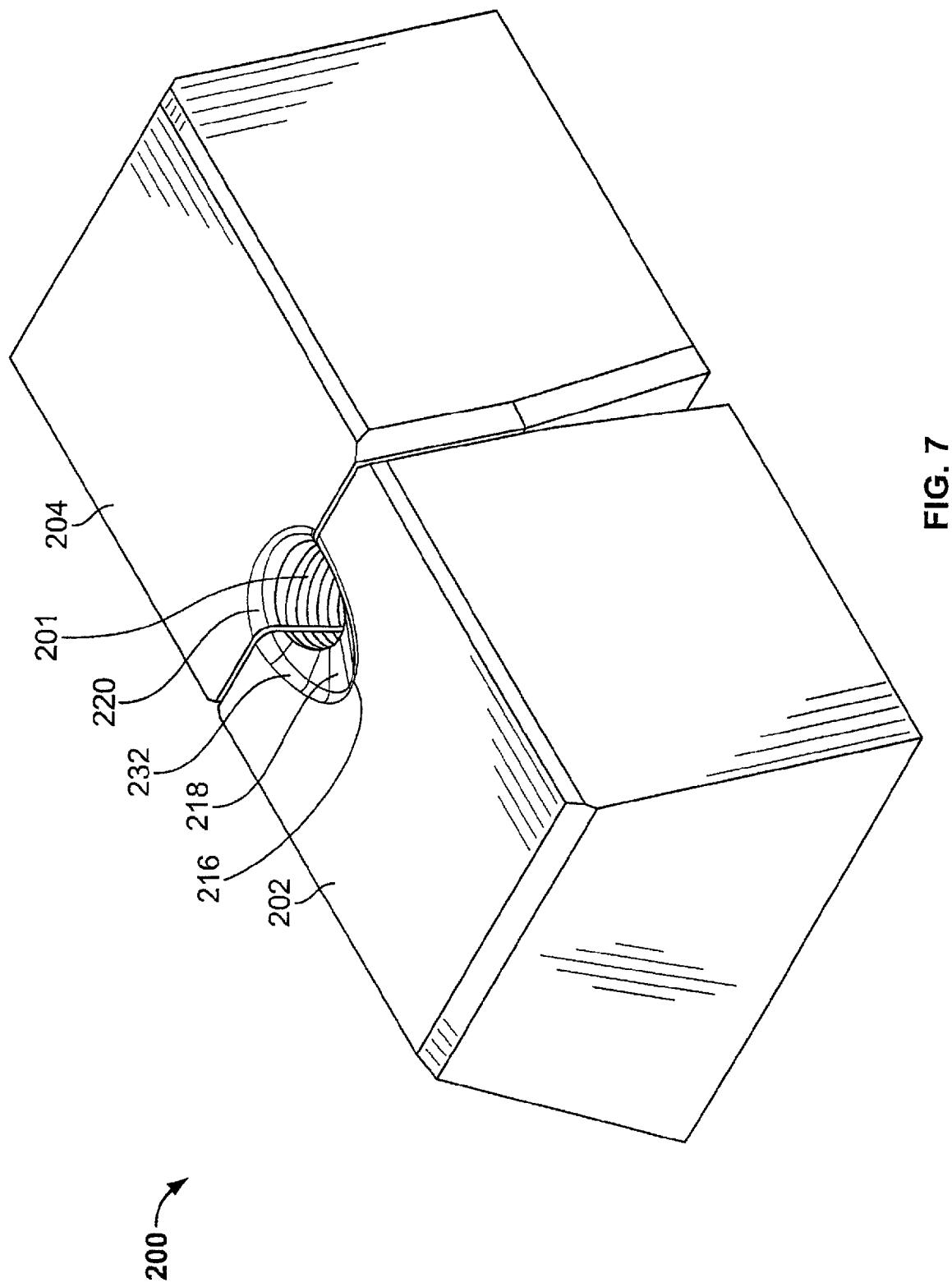
FIG. 7 is a perspective view of a die used to grip the offset nail shank.

FIG. 6 simulates a load or force F produced by a power driving tool on one embodiment of the offset nail. In this embodiment, the head 12 has a thickness of about 25 mils to about 45 mils and preferably about 35 mils. In comparison, typical round head offset nails have a thickness of about $50/1000$ inch (50 mils). The modeling diagram shown in FIG. 6 shows that an embodiment of the offset nail, having a head thickness thinner than heads of known nails, withstands the same amount of force that a thicker headed nail can withstand, without deforming. The shank 14 exhibits almost no bending stresses from the force F on the toe 16 of the head 12. The support gusset 18 acts to support the toe 16 of the head 12 and re-distributes the stress imparted on the toe 16 through the shank 14. With the support gusset 18, the thinner head 12 can withstand forces at least equivalent to those imparted on known offset nails having thicker heads.

Figure 8:
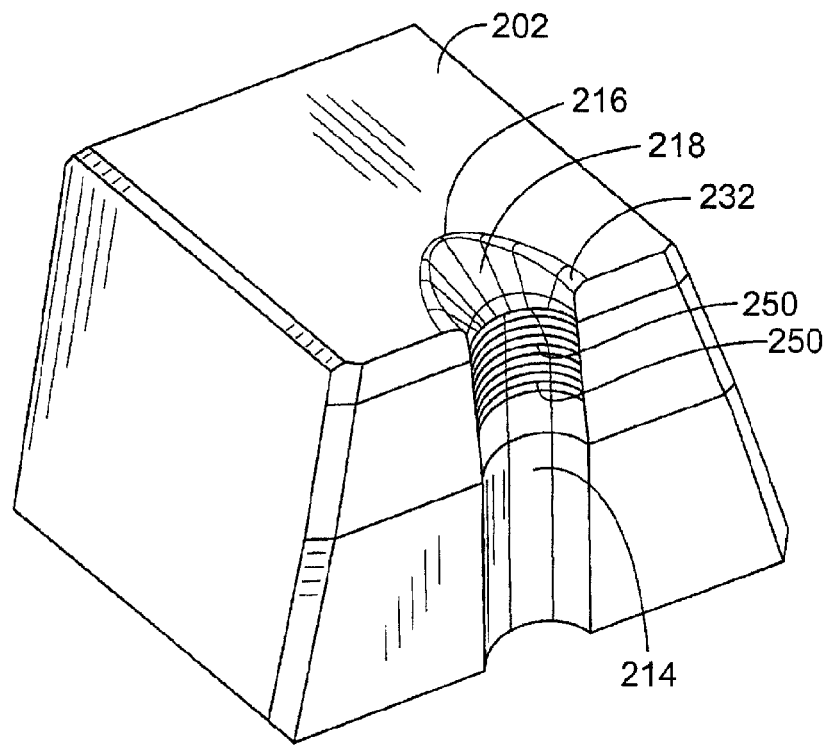
FIG. 8 is a perspective view of a first of two grippers of the present die.

FIGS. 7-10 illustrate a die 200 used to form the offset nail 10. The die 200 includes an opening 201 for receiving a wire to form the offset nail 10 of FIG. 1. A present embodiment of the die 200 includes two grippers, 202 and 204. In FIG. 8, gripper 202 includes die cavities 214, 216, and 218 forming shapes complimentary to a portion of the shank, a portion of the heel, and a portion of the support gusset respectively of the offset nail 10. A portion of the die complimentary to the support gusset edge 232, 233 defines a perimeter of the support gusset 18 as seen in FIG. 3. The grippers 202, 204 also have grooves 250 to hold the wire in the grippers and form complimentary ridges on the shank 14 of the offset nail 10.

Figure 9:
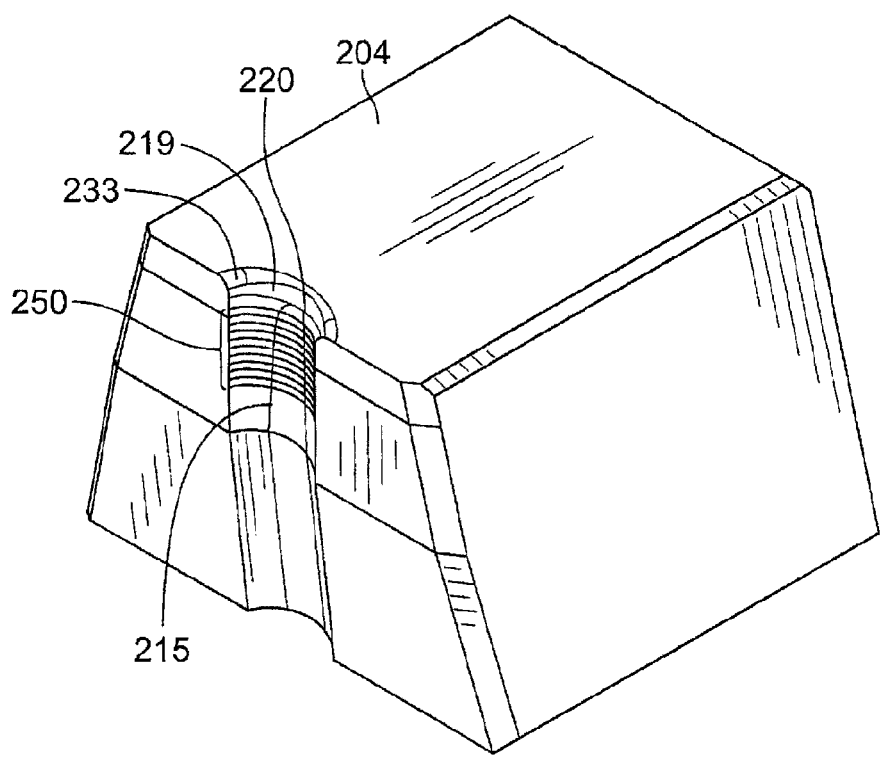
FIG. 9 is a perspective view of the of the second of two grippers of the present die.

FIG. 9 shows gripper 204 having die cavities 215, 219, and 220 complimentary to the shape of a second portion of the shank, a second portion of the head, and a second portion of the support gusset. The portion complimentary to the support gusset edge 233 is shown with the cavities 219 and 215 approximately collinear at 220.

Figure 10:
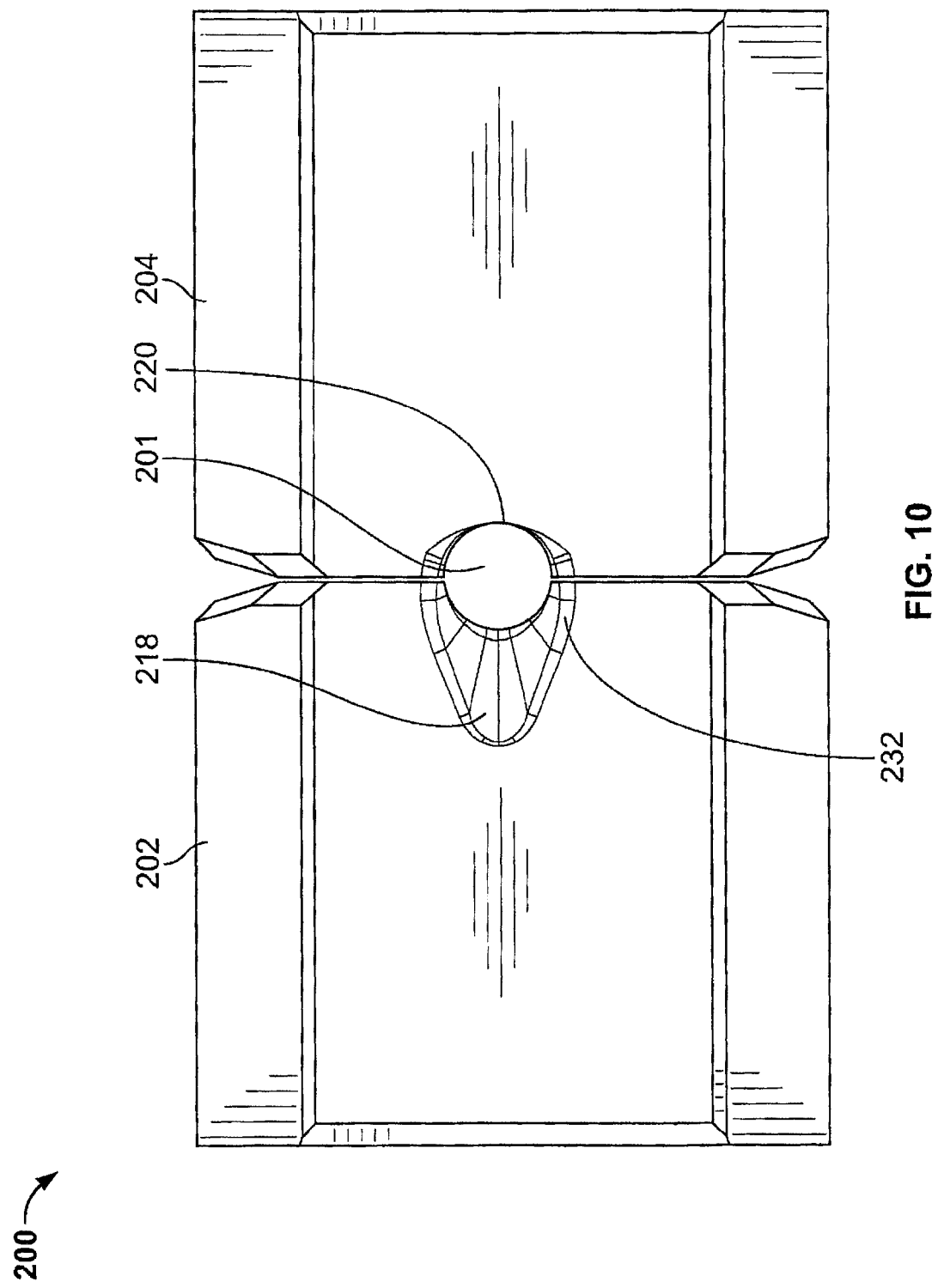
FIG. 10 is a plan view of the present die.
Figure 12:
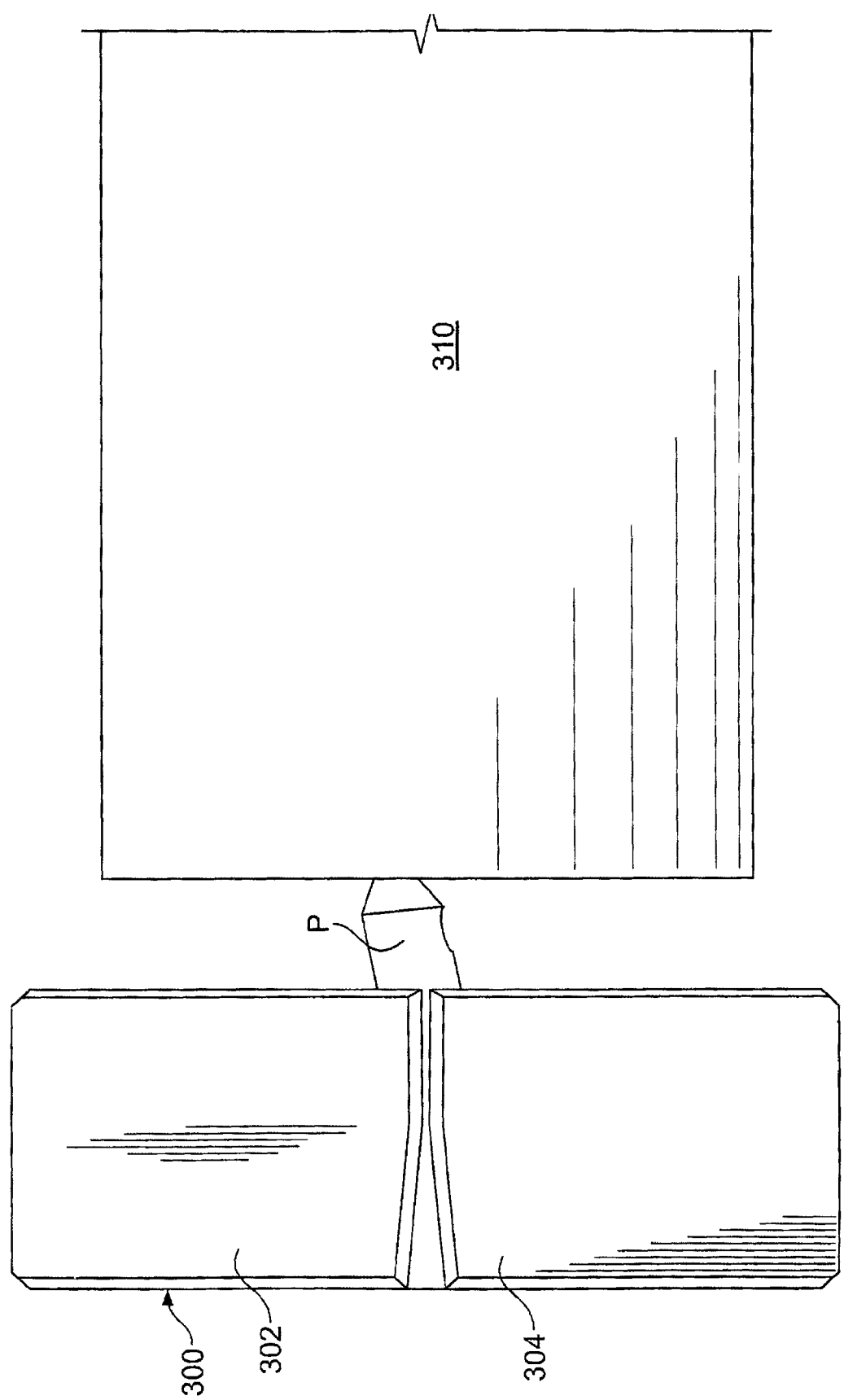
Figure 13:
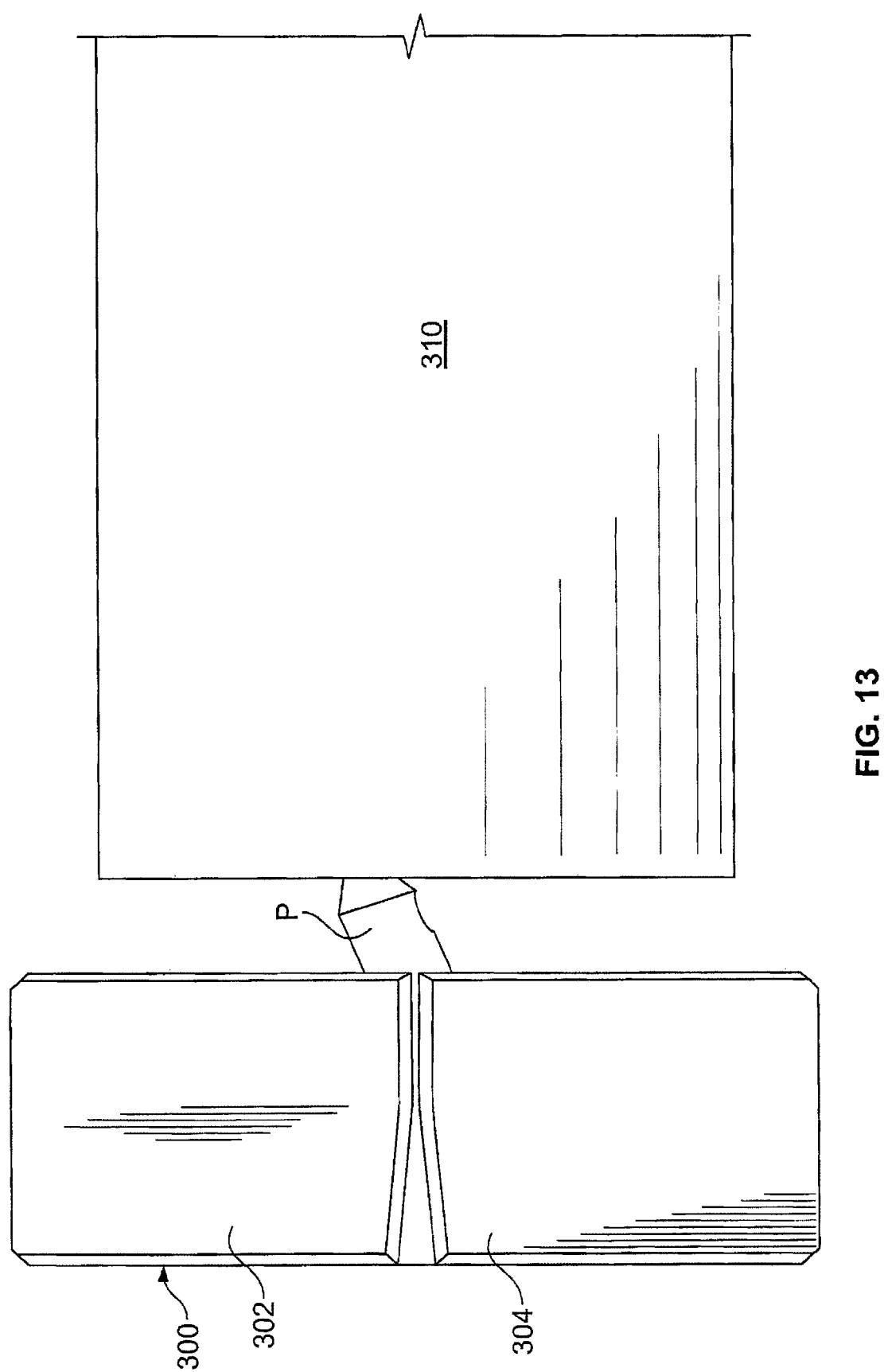
Figure 14:
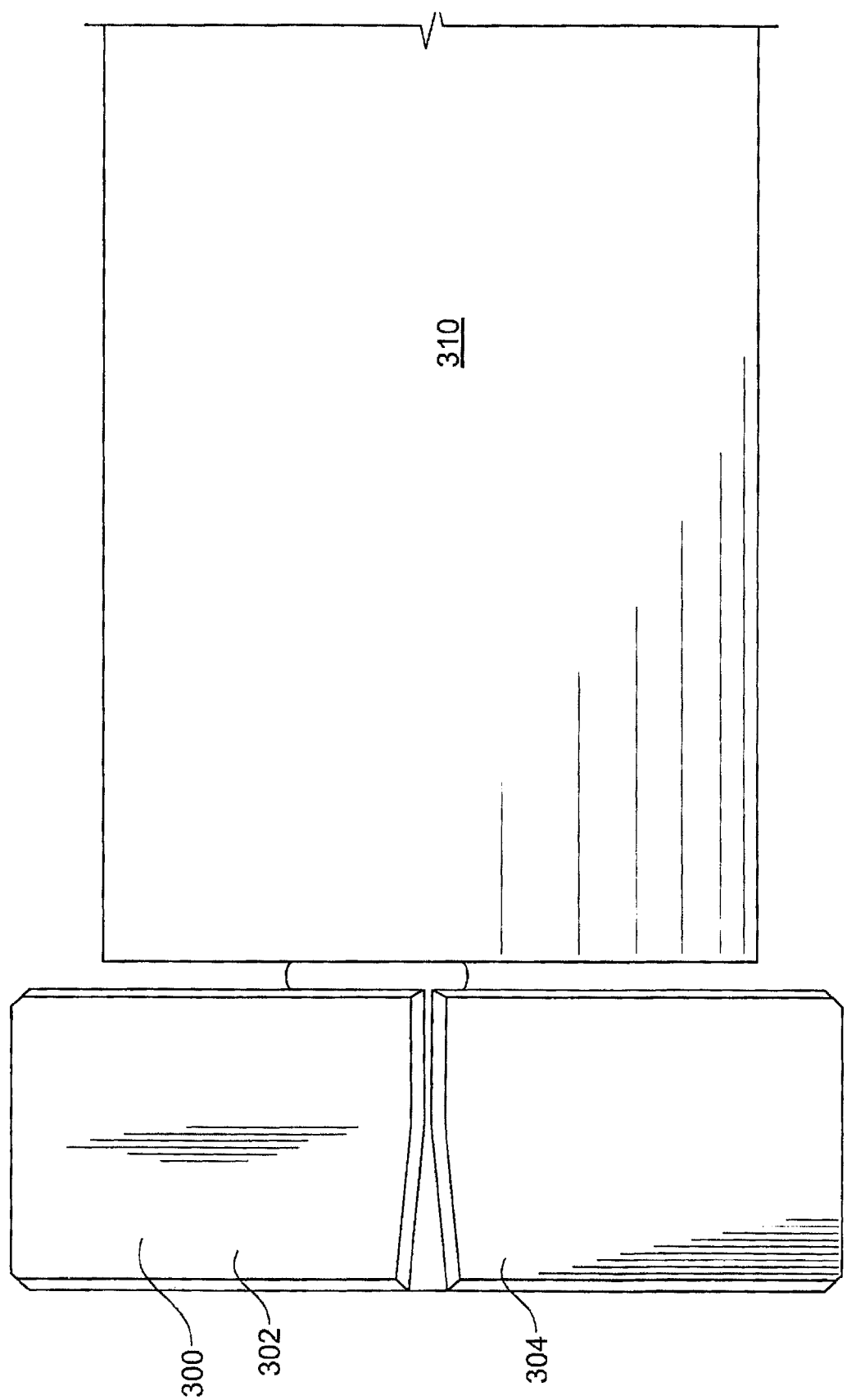

FIG. 10 illustrates a plan view of the die 200 formed by the two grippers 202, 204. An opening 201 is present when the two grippers 202, 204 are placed together. The full perimeter of the support gusset edge 232, 233 is seen as an ovoid or pear shape. The head 12 is formed integral to the support gusset edge 32 formed by the die portions 232, 233. The opening 201 also defines the perimeter or circumference of the shank 14.

The offset nail is manufactured by either a single blow nail heading machine or using cold rolling methods known to those skilled in the art.

For single blow nail head formation, as shown in FIG. 11-14, the wire segment W is struck with a hammer-type element 310 using a single blow designed to form a round head from the portion of the wire segment P protruding from the die 300. As shown in FIG. 11, a hammer-type device 310 is used to press the wire segment into the offset, round or partially round-head formation. The portion of the die complimentary to the support gusset facilitates the flow of metal wire to form the round head.

In the cold rolling process, a nail wire segment is inserted into a die with a portion of the wire exposed. Through precise angled rolling of the first roller over the die, a pre-bent shape is formed. The offset nail is then formed with a round head and a support gusset using a second compression roller.

The clamping die, or "gripper", is tooled with geometry complimentary to the support gusset of the offset head nail, but does not have an impression of the circular profile of the round head. Therefore, a precise pre-bent shape, in combination with the precise ovoid or tear-shaped gusset form, is necessary to manufacture the circular/round, or semicircular or partially round profile of the round heads of the offset nail. The portion of the die complimentary to the support gusset facilitates the flow of metal wire to form the round head. No cavity is present in the die as a mold or pattern for a round head; such a cavity may cause the die to break in the event of an accidental over-fill condition. In other words, the support gusset not only strengthens the integrity of the junction of head and shank and redistributes load applied, the die portion complimentary to the support gusset also facilitates the formation of the desired circular profile of the round or partially round head.

The complimentary support gusset portions aids in the formation of the circular or partially circular profile of the head. The complimentary gusset portions, in conjunction with the precise attitude and cubic volume of the pre-bent blank, urge the metal wire segment to flow in such a manner as to form a circular or partially circular profile for a head.

Preferably no extra wire or material is needed to create the support gusseted, offset nail. Rather than forming a head thickness similar to thicknesses of known offset nails, the present die forms a head having a thickness $t_H$ as shown in FIG. 2. The die distributes the wire segment material such that the support gusset 18 is formed, and at the same time forms a head 12 that has a thickness $t_H$ less than offset nails currently available, without diminishing the strength or integrity of the head 12. It will, however, be recognized that in certain configurations and/or sizes a small amount of additional material (that is, over an above a non-gusseted nail) may be used in forming the present offset nail.

Figure 15:
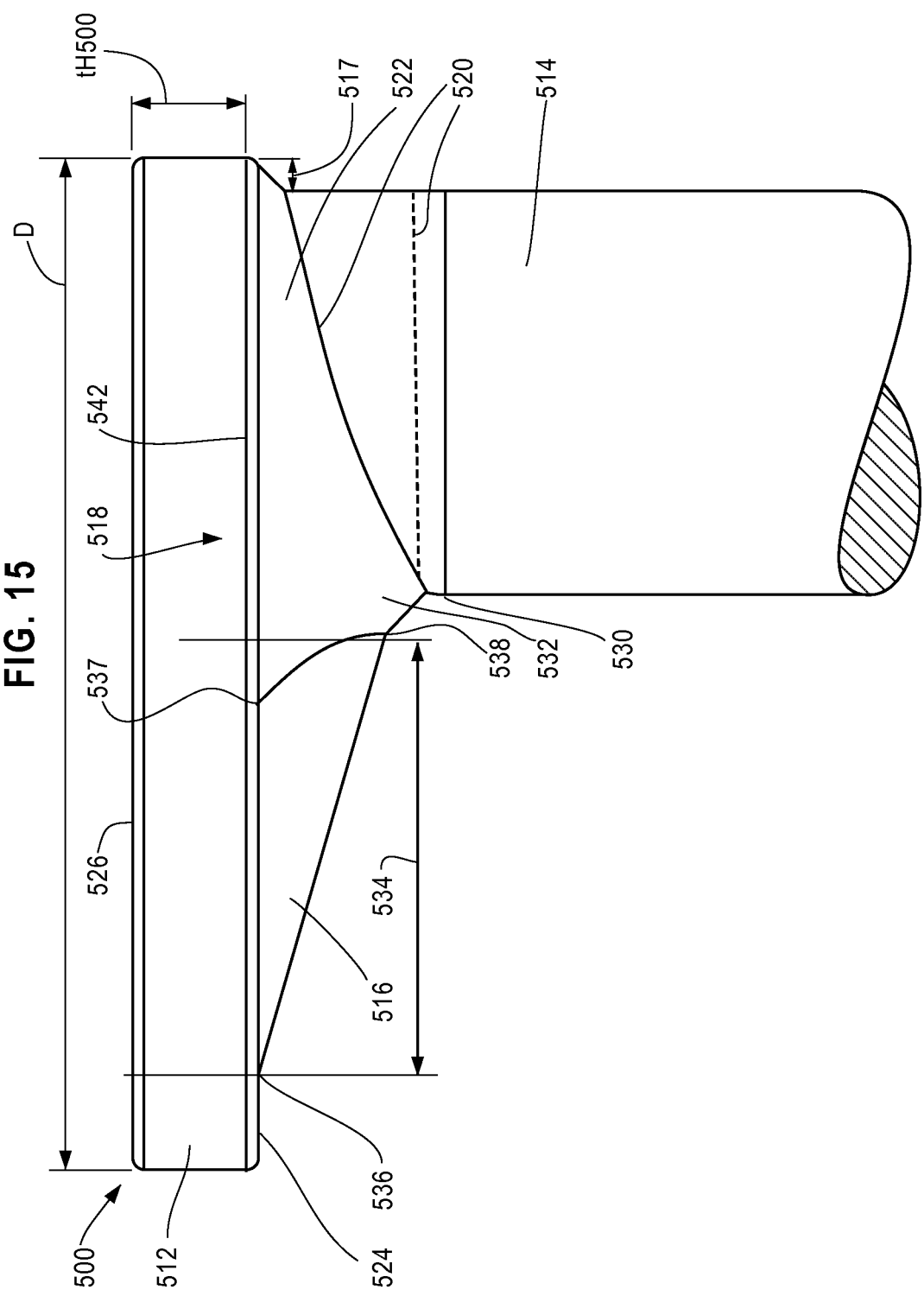
FIG. 15 is a side view of another embodiment of an offset nail in accordance with the principles of the present invention.

In another embodiment, shown in FIGS. 15 and 15A, an offset nail 500 having a multi-tiered or stepped support gusset 518 is shown. The offset nail 500 can have a full or partially round head 512 and a shank 514. The shank 514 defines a longitudinal axis $A_{514}$. The illustrated head 512 has a circular profile having a top surface 526 and a bottom surface 524. The shank 514 is positioned within the circumference of the head 512. The head 512 has a diameter D. The toe 516 overhangs or extends beyond the diameter of the shank 514. Optionally, as seen in FIGS. 15 and 15A, a heel 517 can also overhang or extend beyond the diameter or footprint of the shank 514. In the configuration in which the heel 517 does not overhang the shank 514, the rear portion of the head 512 is coextensive with the portion of the shank with which it is longitudinally aligned.

The head 512 has a thickness $t_{H500}$, and in an embodiment is about 25 mils to about 45 mils and preferably about 35 mils. The support gusset 518, including the conical gusset 532 and tear-shaped gusset 534, envelopes the junction 522 between the shank 514 and the head 512.

The conical gusset 532 merges with the superior portion of the shank, shown generally at 522 of the shank 514. The conical gusset 532 widens gradually from a bottom edge 540 to a top portion 542 as it reaches an underside of the head 512. The conical gusset 532 flows from along an undersurface of the head 512 at the anterior portion of the toe, shown generally at 537 and tapers down to the anterior surface (shown generally at 530) of the shank 514. The bottom edge 540 of the conical gusset 532 may be formed generally askew or parallel to a plane parallel to the upper surface 526 of the head 512.

At least one tear-shaped gusset 534 extends from a toe side 538 of the conical gusset 532, radially toward the toe at 536. The tear-shaped gusset 534 is a lofted surface flowing from the undersurface 524 of the head 512 down, at or adjacent to the conical gusset at 538, and may have a convex or concave shape as it widens and thickens gradually from the toe 516 at 536 to the conical gusset 532 at junction 538. The tear-shaped gusset 534 may cover the entire undersurface 524 of the toe 516, or may cover a portion of the undersurface of the toe 516.

Referring to FIG. 15A, the shank 514 has an axis $A_{514}$ and the conical gusset 532 forms an angle $\alpha_{532}$ relative to the shank axis $A_{514}$ of about 30 degrees to about 60 degrees. The tear-shaped gusset 534 forms an angle $\alpha_{534}$ relative to the shank axis $A_{514}$ of about 61 degrees to about 80 degrees. It will be appreciated that the gusset 532m, 534 and $\alpha_{532}$, $\alpha_{534}$ being different from one another provide an overall stepped gusset 518 configuration. In the illustrated embodiment, a 2-step (532, 534) gusset 518 is shown, however, it will be appreciated that more than two steps can also be provided.

FIG. 16 illustrates an embodiment of a die 600, having die portions 602 and 603, used to manufacture the offset, multi-tiered support gusset nail 500 as seen in FIG. 15. The multi-tiered support gusset 518 is formed in die portions 618 and 619 that are complimentary to the support gusset. The die portions 618 and 619 include die portions 632, 633 to form the conical gusset 532, and die portion 618 includes die portion 634 to form the tear-shaped gusset 534. Die portion 634 is joined to die portion 632 at the junction shown generally at 638. The die 600 allows both the conical and tear-shaped gussets 532, 534, as seen in FIG. 15 of the multi-tiered support gusset 518 to be formed simultaneously. The complimentary die portion 634 tear-shaped gusset 534 is either a smooth concave surface or is formed from multiple stepped concave portions.

As with the previous embodiment, the portion of the die 600 complimentary to the support gusset 518 facilitates the flow of metal wire to form the round or partially round head 512. No cavity is present in the die as a mold or pattern for a round head; such a cavity may cause the die to break in the event of an accidental over-fill condition. In other words, the support gusset 518 not only strengthens the integrity of the junction 522 of head 512 and shank 514 and redistributes load applied, the die portions 618, 619 complimentary to the support gusset 518 also facilitates in the formation of the desired circular profile of the round or partially round head 512.

The unique nail geometry provided by the support gusset of the offset nail provides many advantages. The offset nail allows for closer spacing of the offset nails in a collating strip and as a result, less collation tape is needed. The close nail spacing also offers improved nail-to-nail support when the nails are ultimately discharged from the power tool, therefore, offering better control and improved nail strip rigidity in handling. In addition, the strength of the nail is not compromised with a thinner head; the same amount or less material is used (although in certain configurations a slightly greater amount of material may be used), but distributed in a unique fashion as to retain or increase the integrity and strength of currently available offset nails. Furthermore, the support gusset provides enhanced strength and integrity at the junction of the head and the shank, preventing breakage or bending of the nail. Moreover, the desired round head for the nail is formed easily using the method and die disclosed.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An offset nail comprising:
   a head having a generally flat top surface and a thickness of about 25 mil to about 45 mil;
   a cylindrically shaped shank extending downwardly from the head positioned off-center with respect to the head to define a toe, the shank defining a longitudinal axis, being substantially perpendicular to the top surface of the head and having a constant diameter; and
   a support gusset extending between and integral with the head and the shank and positioned at a junction of the head and the shank, the support gusset configured to support a portion of the head unsupported by the shank, the support gusset having a bottom edge formed at a boundary of the support gusset and the shank, the bottom edge extending circumferentially about the shank, wherein the support gusset extends axially and radially outward from the bottom edge,
   wherein the support gusset is a two-step gusset having a first gusset portion contiguous with the shank and a second gusset portion contiguous with an underside of the head, the first and second gusset portions contiguous with one another, and
   wherein the first gusset portion defines a first angle relative to the shank axis, and the second gusset portion defines a second angle relative to the shank axis, wherein the first angle and the second angle are different from one another.

2. The offset nail of claim 1, wherein a circumference of the shank is inscribed within a circumference of the head.

3. The offset nail of claim 1 including a heel disposed between the head and the shank, opposite the support gusset.

4. An offset nail comprising,
   a head having a generally flat top surface and a thickness of about 25 mil to about 45 mil;
   a cylindrically shaped shank extending downwardly from the head positioned off-center with respect to the head to define a toe, the shank defining a longitudinal axis, being substantially perpendicular to the top surface of the head and having a constant diameter; and
   a support gusset extending between and integral with the head and the shank and positioned at a junction of the head and the shank, the support gusset configured to support a portion of the head unsupported by the shank;
   wherein the support gusset is a two-step gusset having a first gusset portion contiguous with the shank and a second gusset portion contiguous with an underside of the head, the first and second gusset portions contiguous with one another; and
   wherein the first gusset portion defines an angle relative to the shank axis and the second gusset portion defines an angle relative to the shank axis, the first gusset portion angle and the second gusset portion angle being different from one another.

5. The offset nail of claim 4, wherein the first gusset portion defines an angle relative to the shank axis of about 30 degrees to about 60 degrees and the second gusset portion defines an angle relative to the shank axis of about 61 degrees to about 80 degrees.

6. An offset nail comprising:
   a head having a generally flat top surface and a thickness of about 25 mil to about 45 mil;
   a shank having an axis and depending from and positioned off-center with respect to the head;
   a multi-tiered support gusset having first and second support gusset portions,
   wherein the first support gusset portion encircles a superior portion of the shank and widens to an underside of the head, the first support gusset portion tapering from along an undersurface of the head to the superior surface of the shank, wherein the second support gusset portion is contiguous with the first support gusset portion and extends from the undersurface of the head to adjacent to the first support gusset portion, and widens and thickens from a toe of the head to the first support guest portion, and wherein the support gusset is integral with the head and the shank and configured to support a portion of the head unsupported by the shank.

7. The offset nail of claim 6, wherein the support gusset is positioned at a junction of the shank and the head.

8. The offset nail of claim 6, wherein a circumference of the shank is inscribed within a circumference of the head.

9. The offset nail of claim 6, wherein the first support gusset portion defines an angle relative to the shank axis of about 30 degrees to about 60 degrees and the second gusset portion defines an angle relative to the shank axis of about 61 degrees to about 80 degrees.

10. The offset nail of claim 9, wherein the first support gusset portion angle and the second support gusset portion angle are different from one another.

11. The offset nail of claim 6 including a heel disposed between the head and the shank, opposite the support gusset.

* * * * *